United States Patent
Halford

(10) Patent No.: US 9,610,709 B2
(45) Date of Patent: Apr. 4, 2017

(54) TOOL MANAGEMENT SYSTEM

(71) Applicant: SURFACE GENERATION LIMITED, Oakham (GB)

(72) Inventor: Ben John Halford, Oakham (GB)

(73) Assignee: SURFACE GENERATION LIMITED, Rutland (GB)

( * ) Notice: Subject to any disclaimer, the term of this patent is extended or adjusted under 35 U.S.C. 154(b) by 175 days.

(21) Appl. No.: 14/410,207

(22) PCT Filed: Jun. 24, 2013

(86) PCT No.: PCT/GB2013/051651
§ 371 (c)(1),
(2) Date: Dec. 22, 2014

(87) PCT Pub. No.: WO2014/001772
PCT Pub. Date: Jan. 3, 2014

(65) Prior Publication Data
US 2015/0336295 A1    Nov. 26, 2015

(30) Foreign Application Priority Data
Jun. 25, 2012    (GB) .................................. 1211191.0

(51) Int. Cl.
*B29C 35/00*    (2006.01)
*B29C 31/00*    (2006.01)

(52) U.S. Cl.
CPC ............ *B29C 31/00* (2013.01); *B29C 35/007* (2013.01); *B29C 35/00* (2013.01)

(58) Field of Classification Search
CPC .......... B29C 2035/0216; B29C 35/007; B29C 45/0084; B29C 2045/0084
See application file for complete search history.

(56) References Cited

U.S. PATENT DOCUMENTS

| | | | | |
|---|---|---|---|---|
| 4,555,086 A | * | 11/1985 | Kiyotomo | B29C 33/442 249/67 |
| 5,281,124 A | | 1/1994 | Delcroix | |
| 6,018,690 A | | 1/2000 | Saito et al. | |
| 2004/0069448 A1 | * | 4/2004 | Suenaga | F24D 3/02 165/47 |
| 2006/0253225 A1 | * | 11/2006 | Ueno | H02J 4/00 700/298 |
| 2010/0003359 A1 | | 1/2010 | Shimoda et al. | |

FOREIGN PATENT DOCUMENTS

| | | | |
|---|---|---|---|
| DE | 19651484 | | 6/1998 |
| DE | 102007059781 | * | 6/2009 |
| GB | 2321959 A | | 8/1998 |
| JP | 2008-101885 | * | 5/2008 |

OTHER PUBLICATIONS

Electronic translation of DE 102007059781.*
International Search Report and Written Opinion of Oct. 8, 2013 in related PCT application PCT/GB2013/051651.
Patents Act 1977: Amendment to Search Report of Mar. 19, 2013 in related GB Application No. GB1211191.0.

* cited by examiner

*Primary Examiner* — Jill Heitbrink
(74) *Attorney, Agent, or Firm* — Young Law Firm, P.C.

(57) ABSTRACT

The present invention provides a method and system for the management of multiple heated mould tools (302, 304) in a facility with limited resource, by monitoring energy usage of a first mould tool (302), and starting a second mould tool (304) when enough energy is available.

17 Claims, 6 Drawing Sheets

TOOL MANAGEMENT SYSTEM

BACKGROUND

The present invention is concerned with a method and system for mould tool supply resource management. More specifically, the present invention is concerned with a method and system for the management of a plurality of mould tools, each of which utilises fluid-based heating.

It is known to control the temperature of a mould tool using a heated fluid, as shown for example in the applicant's earlier patent application published under WO2011/048365.

The applicant's as yet unpublished patent application, GB 1113658.7, discloses a type of mould tool comprising a number of individual heated elements. Compressed air is fed into a fluid chamber of each element and selectively heated by an inline air heater at the inlet to each chamber in order to dynamically control the temperature of the tool face. The mould tool can thereby be heated and cooled (by deactivating the heater).

Air heated mould tools require both electrical power for the heater and a source of compressed air. Sometimes a compressor is provided which itself requires electrical power. Generally, the compressor will have a limited output dependent upon ifs performance. Therefore the number of tools that can be run simultaneously is limited by two factors—the electrical power and compressed air available at any given time. The maximum electrical power requirement of such a mould tool can be determined by calculating the maximum power to be consumed when all of the zones are heating the tool, i.e. are "full on".

The maximum compressed air requirement of such a mould tool can be determined by calculating the maximum compressed air to be consumed when all of the zones are cooling the tool. Manufacturing facilities generally have a peak electrical power capacity, which may be determined by e.g. the capabilities of the power infrastructure. As described above, the peak compressed air flow rate is limited by the air supply system (whether by compressor or stored in tanks).

If multiple mould tools are installed in a single facility, according to the prior art the maximum number of mould tools is based on a summation of their combined maximum resource requirement. By "resource" we mean consumable utility, in particular electrical power or compressed air This limits the number of mould tools present in a given facility.

BRIEF DESCRIPTION OF THE DRAWINGS

An example method and system according to the present invention will now be described with reference to the following figures, in which:—

DETAILED DESCRIPTION

Figure 1:
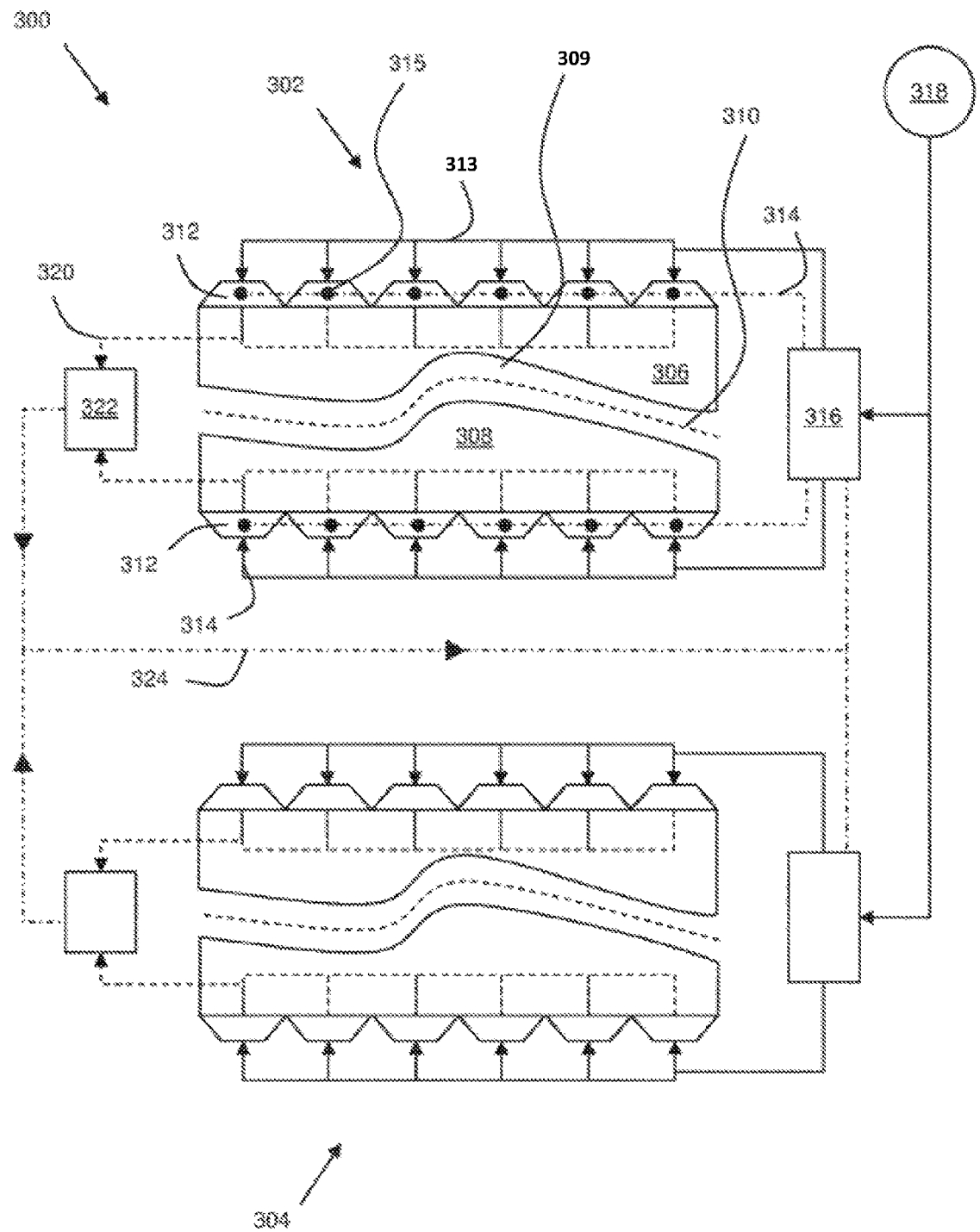
FIG. 1 is a schematic view of a mould tool system in accordance with the present invention.

It is an object of the present invention to mitigate the limitation on the number of mould tools installed in a single facility. According to the present invention there is provided a method of controlling a mould tool system having a plurality of mould tools, the method comprising the steps of: providing a plurality of heated mould tools, each having a mould cycle with a variable resource consumption, providing a maximum system resource capacity, lower than the sum of a total summed maximum resource consumption of the plurality of mould tools, starting a mould cycle of a first mould tool, monitoring the resource consumption of the first mould tool, determining an unused system resource availability from the maximum system resource capacity and the resource consumption of the first mould tool, starting a second mould tool cycle dependent upon the unused system resource availability.

Advantageously, this type of tool management allows a manufacturing facility to install more tools, or specifically more tools than the theoretical summed maximum resource consumption allows. As such, and by running the tools concurrently by overlapping their cycles, production is increased. The resource may be electrical power, compressed air supply capacity or both (inasmuch as two maximum system resource capacities may be provided, one for electrical power, and one for compressed air). The fluid may be compressed air from a utility of the facility. Alternatively, the fluid may be compressed air with an increased pressure generated by e.g. electrically powered ducted fans. Preferably the mould tools are fluid heated mould tools.

Preferably the fluid heated mould tools have an exhaust flow during an cooling part of their respective cycles, and in which the method comprises the step of:

starting the second mould tool cycle during the cooling part of the cycle of the first mould tool, and, using the thermal energy of the exhaust flow of the first mould tool to at least partly heat the second mould tool.

Preferably the method comprises the step of:

determining the resource consumption of the first mould tool taking into account the energy available from the exhaust flow of the first mould tool during the cooling part of the first mould tool cycle.

According to a second aspect of the invention, there is provided a method of manufacturing a plurality of workpieces comprising the steps of:

providing a plurality of units of workpiece material, inserting each of the units of workpiece material in a respective mould tool, controlling the mould tools according to the method of the first aspect, extracting the moulded workpieces monitoring the resource consumption of a running mould tool, using the control system to reschedule the mould tool resource demand cycles to account for any deviation of the running mould tool demand cycle from the resource demand cycle of the running mould tool. Advantageously, this aspect of the invention allows planning and therefore prediction of the manufacturing capacity of a given manufacturing facility.

The method according to the second aspect allows the schedule to be adapted dependent upon the performance of the running tool or tools. This recognises that tool performance will vary from the expected performance dependent upon a number of factors such as ambient conditions (temperature, humidity) and the condition of the material (e.g. age of the prepreg). Preferably the method only adjusts the schedule, and not the predicted resource consumption data for the tool itself (e.g. for the next cycle), as it is recognised that some variance will occur According to a third aspect of the invention, there is provided a control system for a tooling system having a plurality of mould tools comprising, a first mould tool, a second mould tool, a first mould tool resource meter arranged to detect the resource consumption of a first mould tool, a memory having:
(i) resource consumption data for the second mould tool, and,
(ii) a system maximum resource capacity,
stored thereon, a processor configured to:

monitor the first mould tool resource meter, determine an unused resource availability from the system maximum resource capacity and the first mould tool resource meter, and, activate the second mould tool based on the resource consumption data of the second mould tool and the unused resource availability.

Preferably the memory has a mould tool queue comprising resource consumption data for a plurality of queued mould tools stored thereon, and in which the processor is configured to selectively activate the next mould tool in the queue based on the resource consumption data of the next mould tool and the unused resource availability. Preferably the first and second mould tools are fluid heated mould tools having a fluid exhaust, and the system comprises a reheat sub-system arranged to selectively conduit exhaust heat from the first mould tool into an input of the second mould tool. Preferably there is provided an exhaust sensor arranged to monitor the fluid exhaust of the first mould tool, and arranged to adjust the resource consumption data of the second mould tool using fluid exhaust data from the heat sensor.

According to a fourth aspect of the invention there is provided a system for the control of a plurality of mould tools comprising, a memory having (i) a plurality of resource demand cycles, each for a respective mould tool and (ii) a maximum resource capacity stored thereon, a processor configured to schedule the plurality of resource demand cycles such that the summed resource demand of the plurality of mould tools is always less than the maximum resource capacity, an output arranged to control the plurality of mould tools in accordance with the scheduled resource demand cycles, a sensor arranged to monitor the performance of a running mould tool, and to communicate the performance to the processor, in which the processor is configured to adjust the schedule depending on the performance of the running mould tool.

The system 300 comprises a first mould tool 302 and a second mould tool 304. The mould tools are substantially identical and as such only the mould tool 302 Will be described in detail here. The mould tool 302 has an upper tool part 306 and a lower tool part 308 which define a cavity 309 suitable for moulding a workpiece 310. Each of the mould tools is separated into heating zones, the temperature of which is controlled by a fluid heating & cooling apparatus 312. Both upper and lower tool parts are fed compressed air at a variable, controlled flow rate via man supply line 313, which may be selectively heated by an inline air heater shown schematically at 315. Each heater 315 is fed by a power line 314. Both the flow of air and power through the supply line 313 and the power line 314 respectively are controlled by a control system 316 in turn fed by an electricity supply 318 and a compressed air supply (not shown).

In order to heat the tool, compressed air is fed into the apparatus 312 and heated. As the air impinges on the rear of the respective tool part 306, 308 it heats the tool. The flow of fluid into the apparatus 312 and the electrical input to the heaters is controlled by the control system 316 to adjust the tool temperature. The tool can also be cooled by pumping ambient temperature air into the apparatus 312 to conduct, and then convect, thermal energy from the tool.

The tools 302, 304 also have an exhaust recirculation system in which air from the heating & cooling apparatus 312 is selectively ducted through conduits 320 to a manifold 322 where it travels to the control system for the second tool 304 and can be selectively used as the input to the heating and apparatus on the second tool 304. Beneficially, this avoids thermal energy being wasted, and reduces the load on the electricity supply 318 as will be described below. In the embodiment shown, exhaust air can be recirculated back into the same tool, or moved to another tool as required.

Figure 1A:
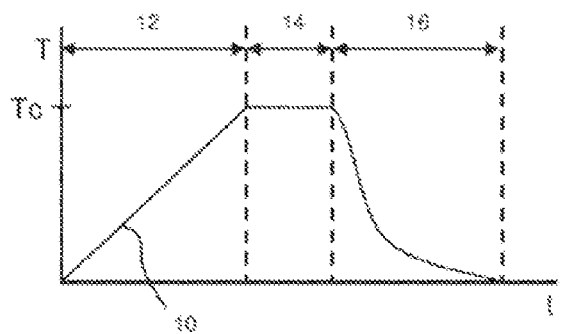
FIG. 1*a* is a graph of the desired temperature profile of a typical mould tool.

During a simple curing process a mould tool such as the tools 302, 304 has a desired temperature versus time plot 10 as shown in FIG. 1a (y-axis=temperature "T", x-axis=time "t"). In a first time period 12, the temperature is rising to cure temperature "Tc". During a second time period 14, the tool is held at cure temperature Tc whilst the workpiece cures. Finally, during a third time period 16, the temperature reduces rapidly following successful curing (i.e. the tool is actively cooled to inhibit the curing process once it has reached the desired stage).

Figure 1B:
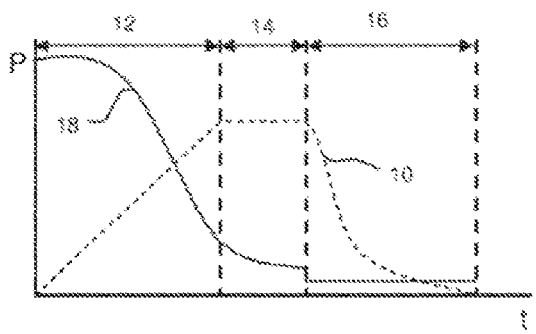
FIG. 1*b* is a graph of the electrical power requirement of a mould tool having the desired temperature profile of FIG. 1*a*.

Turning to FIG. 1b, the temperature plot 10 is shown in hidden line for guidance. A power graph 18 is shown in solid line (y-axis=power "P", x-axis=time "t"). As shown, the power requirement 18 starts very high as the temperature increases in time period 12. The power consumption drops towards the time period 14 where the temperature is constant and then drops to a minimum during time period 16 as the tool is cooled.

Figure 1D:
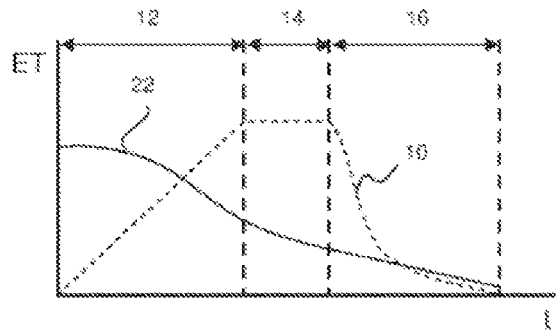
FIG. 1*d* is a graph of the exhaust temperature of a mould tool having the desired temperature profile of FIG. 1*a*.
Figure 1C:
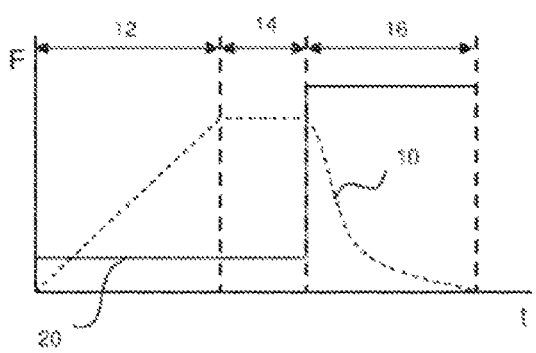
FIG. 1*c* is a graph of the airflow requirement of a mould tool having the desired temperature profile of FIG. 1*a*.

Turning to FIG. 1c, again the temperature 10 is shown in hidden line. FIG. 1c shows a fluid flow plot 20 into the fluid chamber(s) in solid line (y-axis=flow rate "F", x-axis=time "t"). As can be seen, the flow rate 20 is generally low across time periods 12 and 14 whilst the tool is being heated (to give the fluid time to conduct thermal energy to the tool), and increasing in time period 16 as the tool is cooled (to conduct and then convect as much thermal energy away as possible).

Figure 1E:
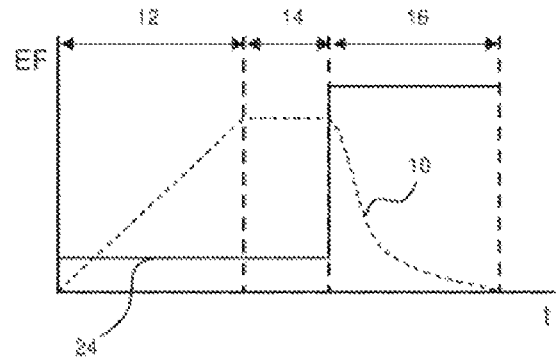
FIG. 1*e* is a graph of the exhaust flow of a mould tool having the desired temperature profile of FIG. 1*a*.
Figure 2A:
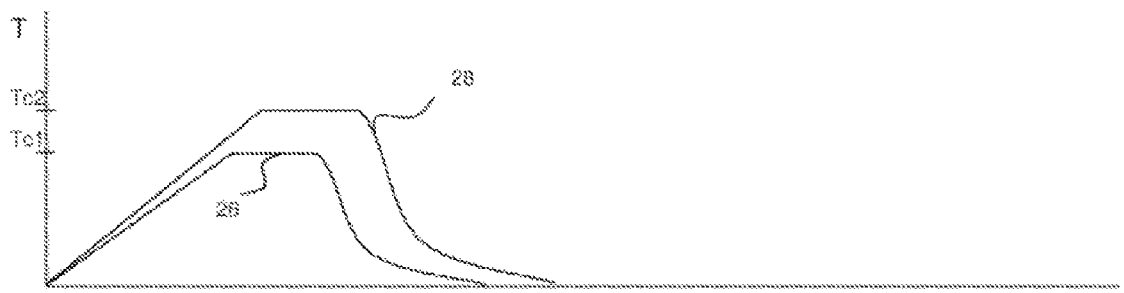
FIG. 2*a* is a graph of the desired temperature profile of two different mould tools managed according to a method and system in accordance with a first aspect of the present invention.

With this type of mould tool, an exhaust flow is created as heated air, which retains some residual thermal energy, leaves the tool. As shown in FIG. 1d, the exhaust temperature ET shown as graph 22 starts high and gradually decreases. Turning to FIG. 1e, the exhaust flow rate EF is shown at line 24 which increases in line with the input flow rate as shown in FIG. 1c. Turning to FIG. 2a, desired temperature profiles of two mould tools are shown (e.g. mould tool 302 and mould tool 304). A first temperature profile 26 for a first mould tool and a second temperature profile 28 for a second mould tool are shown. The first tool temperature profile 26 ramps up to a first curing temperature Tc1 and second tool 28 ramps up to a second curing temperature Tc2, slight later, and for slightly longer.

Figure 2B:
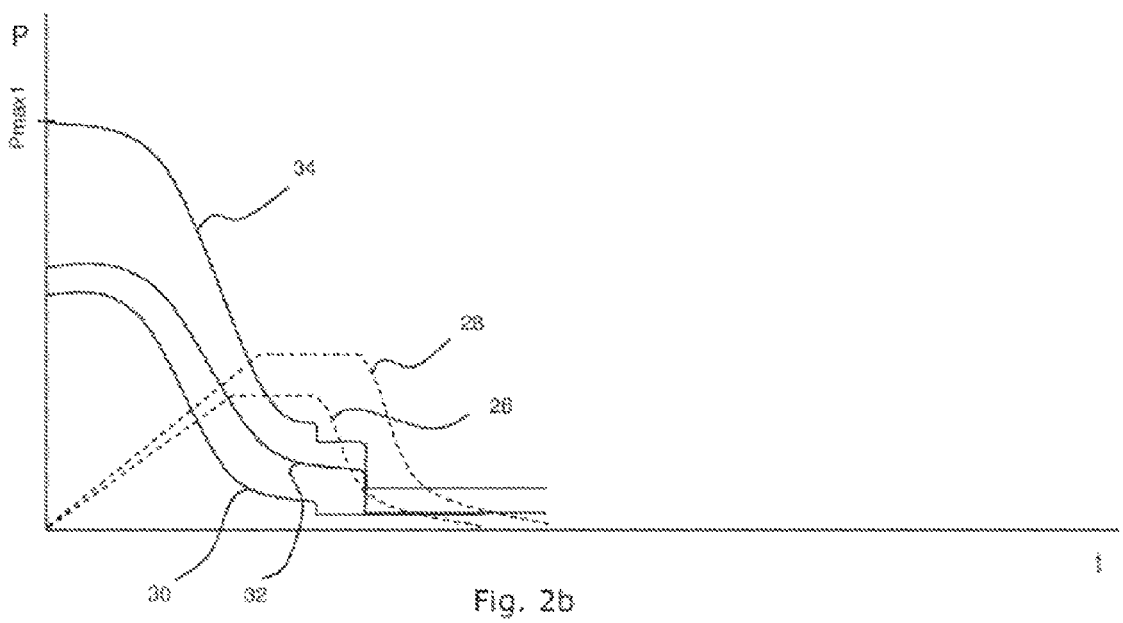
FIG. 2*b* is a graph of the individual and summed power requirements of the mould tools of FIG. 2*a*.

Turning to FIG. 2b, the power requirement of the first mould tool is shown at line 30 and the second mould tool at line 32. The summed power requirement is represented by line 34 (i.e. the sum of lines 30 and 32). As can be seen on the Y axis, the manufacturing facility needs to be able to provide a power of Pmax1 assuming the tools are permitted to draw maximum power simultaneously.

Figure 3A:
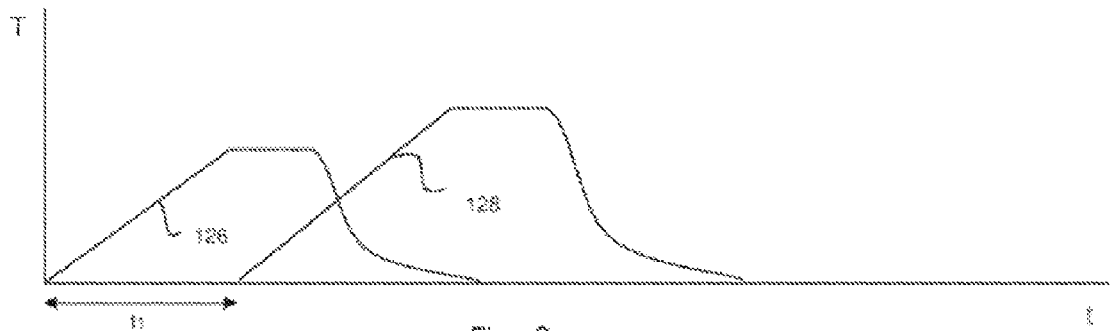
FIG. 3 *a* is a graph of the desired temperature profile of two different mould tools managed according to a method and system in accordance with a second embodiment of the present invention.
FIG. 3*b* is a graph of the individual power requirements of the mould tools of FIG. 3 *a*.
FIG. 3*c* is a graph of the summed power requirements of the mould tools of FIG. 3 *a*.
Figure 3B:
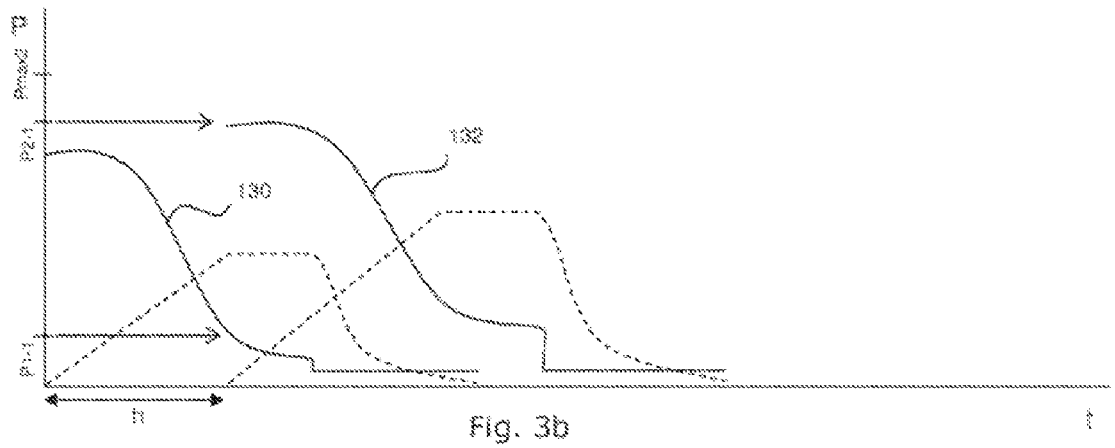
Figure 3C:
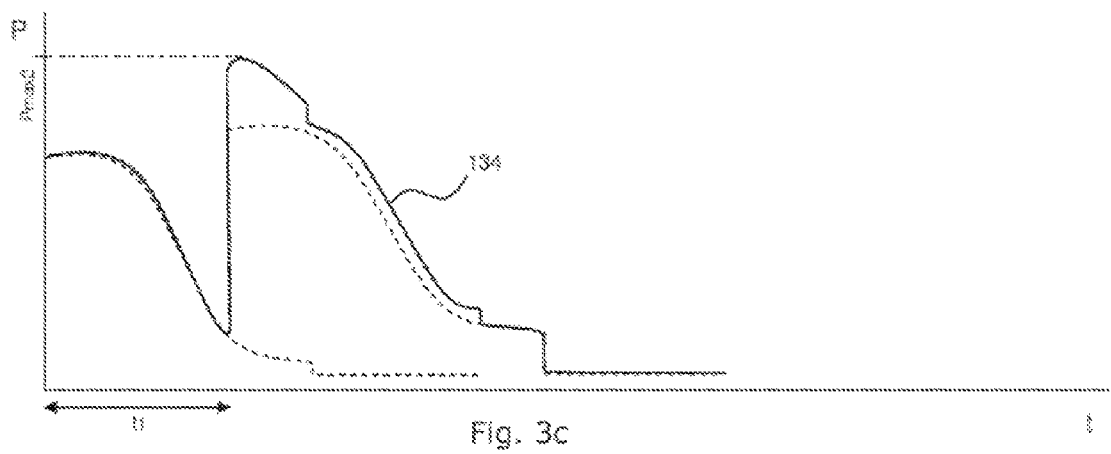

Turning to FIGS. 3a to 3c, characteristics of a system managed in accordance with the present invention are described (graphs are numbered 100 greater than FIGS. 2a and 2b).

The facility in which the tools of FIGS. 3a to 3c are installed has a maximum power output of Pmax2, which is lower than the sum of the summed maximum tool requirements Pmax1. Therefore the tools cannot be operated per FIGS. 2a and 2b.

According to the present invention, the tools are operated as follows:

Firstly, the first tool is started as represented by the temperature plot 126 of FIG. 3a. The power draw of the first tool is shown in FIG. 3b at line 130.

As discussed above, as the first tool temperature increases, its power requirement drops. The method according to the invention provides that as soon as the power consumption of the first tool drops below a predetermined level P1-1 at time t1, the second tool is started (represented by plot 132). The power level P1-1 is calculated by subtracting the maximum power of the second tool (P2-*i*) from Pmax2. (It is conceivable that a safety factor is also subtracted to determined Pi_i). As shown in FIG. 3c, the maximum power requirement of the system is at time t1, and is therefore equal to Pmax2.

Further tools can be managed by this system, such that they run consecutively. A queuing system is formed in which the next tool maximum power requirement is subtracted from the maximum power output of the system to determine the predetermined level. When the power consumption of the tool being run drops to that predetermined level, the next tool is started. A single tool will inevitably run more than one time, and will rejoin the queue as appropriate.

In other words, the method according to the invention monitors the unused energy of the system (that is Pmax2 minus the energy being used). Once this drops below the maximum energy consumption of the next queued tool, the next queued tool is started. The example shown in FIGS. 3a to 3b ignores the possibility for recycling exhaust heat.

Multiple tools may be run simultaneously. The method according to the invention simply monitors the unused energy in the system, and once this drops below the maximum power requirement of the next queued tool, it is started. It may be the case that if two tools are being run simultaneously, and their power consumption drops together, the next two queued tools are started at about the same time.

The tools described herein are fluid heated and cooled—that is they have a variable flow rate into the tool and a variable thermal energy input into that flow in order to heat or cool as discussed above.

It will be noted that it is within the scope of the present invention to monitor the air usage, and capacity in the same way as the power use and capacity is monitored. This may be in addition or instead of the above-described power control. Whether electrical power, compressed air or both resources control the timing of the tools depends on a combination of factors including the resource availability and the maximum resource consumption of the tools. The present invention also envisages that exhaust fluid (i.e. air) from one tool may be used as an input to another tool, reducing the external power requirement of the second tool. Turning to FIGS. 1d and 1e, it is clear that some residual thermal energy is present in the exhaust from the first mould tool.

Figure 4A:
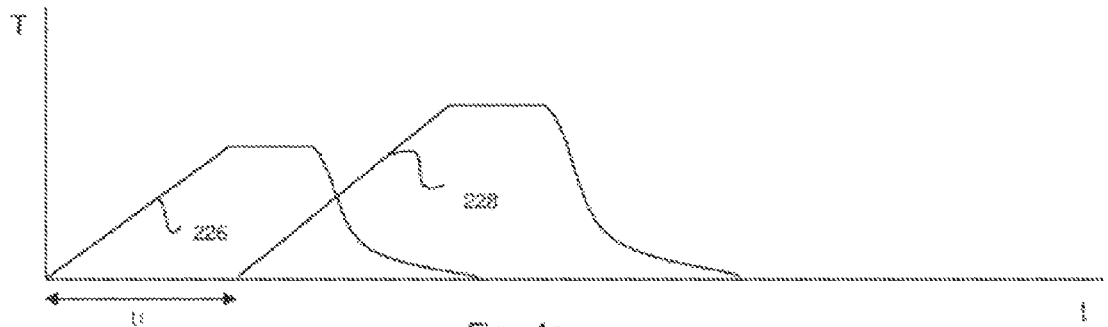
FIG. 4*a* is a graph of the desired temperature profile of two different mould tools managed according to a method and system in accordance with a third embodiment of the present invention.
Figure 4B:
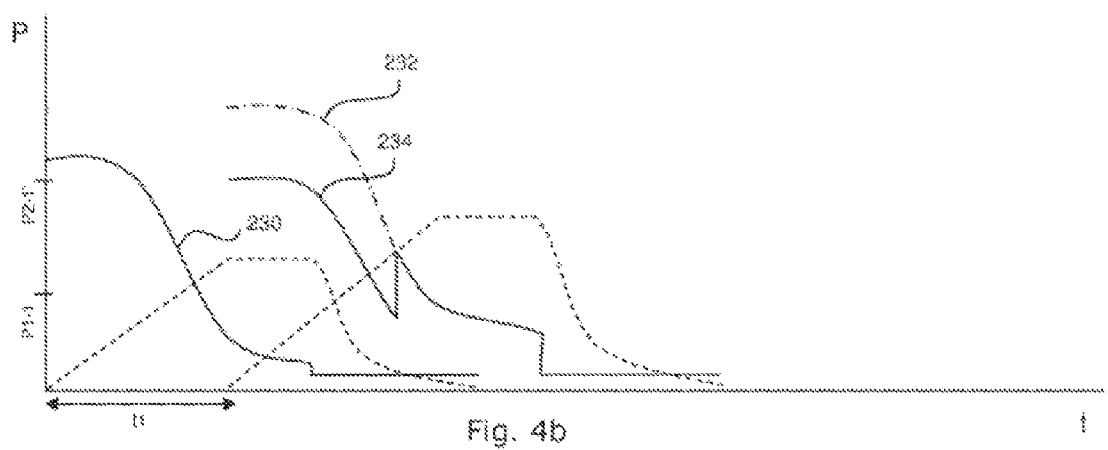
FIG. 4*b* is a graph of the individual power requirements of the mould tools of FIG. 4*a*.
Figure 4C:
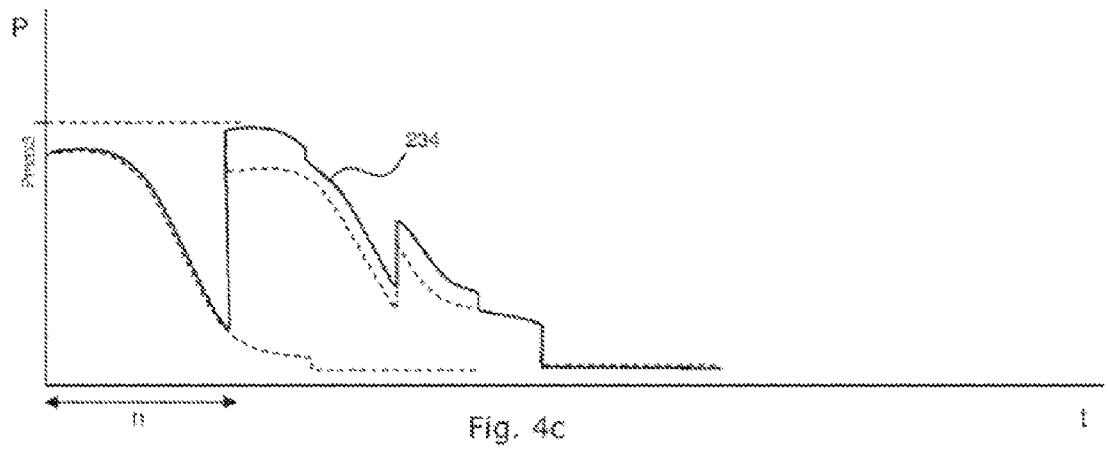
FIG. 4*c* is a graph of the summed power requirements of the mould tools of FIG. 4*a*.

Turning to FIGS. 4a to 4c (with graphs equivalent to 3a to 3c but numbered 100 greater), the two temperature profiles 226, 228 of the first and second mould tools respectively are identical to that of FIG. 3a. Turning to FIG. 4b, the power requirement of the first mould tool 230 is identical to that of 130. The power requirement of the second mould tool 232 is also shown, however, if the output from the first mould tool during the cooling phase (third time period 16) is used in input to the second mould tool, then the (external) power requirement of the second mould tool is reduced according to line 234.

Turning to FIG. 4c, this results in a summed power requirement Pmax3 being significantly lower than Pmax1 and Pmax2, and not significantly higher than a single tool. As discussed with reference to FIGS. 1d and 1e, the maximum exhaust energy output (i.e. combination of flow and temperature) from the first tool is at the start of the cooling time period 16. This can be directly measured by the system and used to determine the adjusted maximum power requirement of the second tool P2-1' in FIG. 4b. Once the unused energy (i.e. Pmax3 minus the power being used by the first tool, Pi_i) increases to the adjusted power requirement of the second tool P2-1\ then the second tool can be started, using the exhaust energy from the first tool.

It will be noted that the exhaust energy available from the first tool will drop, however it can be assumed that the power consumption of the second tool will drop by a greater rate, meaning that the maximum external energy demand of the second tool is at a maximum when it is started. Again, it is envisaged that more than one tool can be run simultaneously with this embodiment. Under these circumstances, a large chamber of pressurised exhaust gas could be stored and used as required. This would make the adjusted maximum energy consumption (i.e. used by tools employing exhaust gas) more predictable.

A control system according to the invention may also store data concerning the power demand across the entire moulding cycle for each of a plurality of tools. In this way, the control system can predict time t1, and schedule the next tool for initiation of its moulding cycle. The system may also contain predicted exhaust data for the mould tools, so exhaust fluid recirculation can also be used to predict when the next tool will start.

The control system adjusts its data based on the performance of the mould tool through previous cycles. For example if the power demand of a first tool drops off quicker than predicted, then the first mould tool data will be amended as appropriate (the effect of which will be starting the second tool sooner in future cycles). As such, the system comprises a database of tool performance and the various parameters shown in FIGS. 1a to 1e. In some instances, the power demand profile of a mould tool is predictable, for example if the tool has been run before and appears to be consistent in its behaviour.

In this case, the invention provides a method in which the mould tool cycles are scheduled according to their predicted resource consumption. The above described embodiments utilise a system which monitors the unused resource (power) in the system and activates the next tool in the queue once sufficient resource is available. In a scheduled system, the predicted mould tool cycles are stored on a control system memory, and a processor calculates when each mould tool can start. Each mould tool therefore becomes associated with a predicted start time.

Once the system has started, the control system monitors the running tools to compare their progress with the predicted mould tool cycles. Should any one tool be behaving differently to the predicted cycle, then the schedule is amended to account for this. For example, if a tool is heating more quickly than predicted then the next tool's start time can be brought forward to account for this. Tools may not run as predicted for a variety of reasons, for example variations in ambient conditions, age and composition of the mould material (e.g. prepreg).

In this manner, the system becomes adaptive to avoid any "dead time" when the full resource capacity is not being used.

In the embodiments discussed above, each tool has a set temperature plot—i.e. a predetermined heating cycle in order to achieve the desired properties of the workpiece in the mould.

Figure 5A:
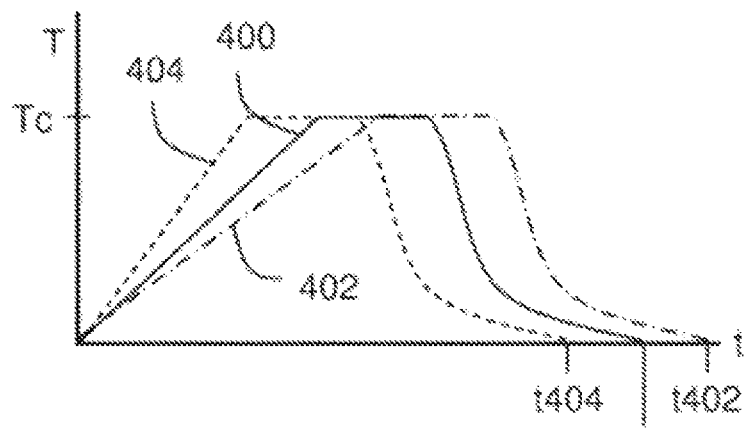
FIG. 5*a* is a is a graph of the desired temperature profile of a mould tool managed according to a method and system in accordance with a fourth embodiment of the present invention.

It will be understood that in many situations, the temperature requirement at any point in time may be given by a range of values. That is, substantially the same effect may be achieved within a "tolerance band" of temperatures. Referring to FIG. 5a, a tool has a mean temperature requirement 400. During the heating phase, the tool may be heated at an accelerated rate 404 or a slowed rate 402 providing substantially the same material properties. The steady-state and cooling parts of the graphs 400, 402, 404 are identical, but their finishing times will differ from the shortest (t404) to the intermediate time (t400) to the longest (t402).

Figure 5B:
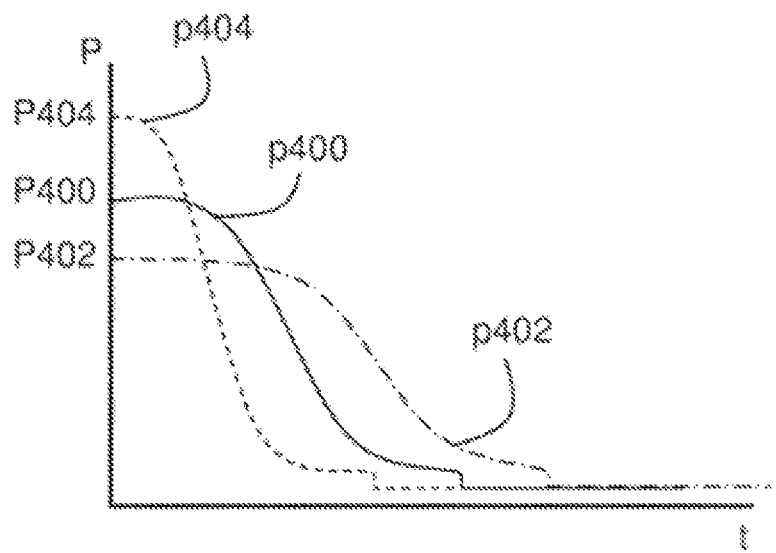
FIG. 5*b* is a graph of the power requirement of the mould tool of FIG. 5*a*. A mould tool system 300 is shown in FIG. 1.

As shown in FIG. 5b this affects the power consumption. The maximum power consumption for the temperature plot 404, p404, is P404. The maximum power consumption for the temperature plot 400, p400, is P400, which is lower than P404. Finally, the maximum power consumption for the temperature plot 402, p402, is P402, which is lower than P404 and P400.

If the system comprises a memory storing the tolerance band for each tool, it will be able to use the bands to affect system performance. For example, the system may be in an "energy conservation" mode during the day, when the total power consumption should be kept to a minimum due to increased energy costs. As such, the system can be programmed to run each tool at the lower end of the tolerance band 402. Factory output will decrease, but costs will also be reduced. By contrast, at night when energy is cheaper, the maximum power consumption can be raised and each tool can be worked at the higher end of the tolerance band 404. The factory output increases, utilising cheaper energy.

Variations fall within the scope of the present invention.

As discussed, any of the above embodiments may be controlled on the basis of compressed air capacity rather than electrical power capacity, or both.

The tools may each use single phase AC heaters, but running from a three phase supply. In this instance, the power availability of each phase can be considered individually and the tools loaded onto an appropriate phase.

The invention claimed is:

1. A method of controlling a mould tool system having a plurality of mould tools, the method comprising:
   providing a plurality of fluid-heated mould tools, each having a mould cycle with a variable resource consumption, each of the plurality of fluid-heated mould tools having an exhaust flow during a cooling part of its respective mould cycle;
   storing a maximum resource consumption for each of the plurality of fluid-heated mould tools;
   storing a maximum system resource capacity for the mould tool system, the maximum system resource capacity being lower than a sum of the maximum resource consumptions of the plurality of fluid-heated mould tools;
   starting a first mould cycle of a first fluid-heated mould tool of the plurality of fluid-heated mould tools;
   monitoring the resource consumption of the first fluid-heated mould tool;
   determining an unused system resource availability;
   starting a second mould tool cycle of a second fluid-heated mould tool of the plurality of fluid-heated mould tools, dependent upon the unused system resource availability and a maximum resource consumption of the second fluid-heated mould tool, the second mould tool cycle being started during a cooling part of the first mould cycle of the first mould tool; and
   using thermal energy of the exhaust flow of the first fluid-heated mould tool to at least partly heat the second fluid-heated mould tool.

2. A method of controlling a mould tool system according to claim 1, further comprising the steps of:
   determining an adjusted maximum resource consumption of the second fluid-heated mould tool taking into account an energy available from the exhaust flow of the first fluid-heated mould tool during the cooling part of the first mould tool cycle, starting the second mould tool cycle dependent upon the unused system resource availability and the adjusted maximum resource consumption of the second fluid-heated mould tool.

3. A method of controlling a mould tool system according to claim 1, further comprising the steps of:
   adjusting the maximum resource capacity from a first value to a second that is lower than the first value; and decreasing the maximum resource consumption of the plurality of fluid-heated mould tools within a tolerance band of each of the plurality of fluid-heated mould tools.

4. A method of controlling a mould tool system according to claim 3, wherein adjusting is performed in response to a change in resource cost.

5. A method of controlling a mould tool system according to claim 1, further comprising the steps of:
adjusting the maximum resource capacity from a first value to a second value that is higher than the first value; and
increasing the maximum resource consumption of the plurality of fluid-heated mould tools within a tolerance band of each of the plurality of fluid-heated mould tools.

6. A method for controlling a mould tool system according to claim 5, wherein adjusting is performed in response to a change in resource cost.

7. A method of manufacturing a plurality of moulded workpieces comprising:
providing a plurality of fluid-heated mould tools;
providing a mould tool control system;
providing a plurality of units of workpiece material;
inserting each of the units of workpiece material in a respective fluid-heated mould tool of the plurality of fluid-heated mould tools;
controlling the plurality of fluid-heated mould tools with the mould tool control system according to the method of claim 1; and
extracting the plurality of moulded workpieces.

8. A mould tool system comprising,
a first fluid-heated mould tool having a fluid exhaust;
a second fluid-heated mould tool;
a heat recirculation sub-system configured to selectively conduit exhaust heat from the first fluid-heated mould tool into an input of the second fluid-heated mould tool;
a first mould tool resource meter arranged to detect the resource consumption of a first fluid-heated mould tool;
a memory, the memory comprising, stored thereon:
(i) resource consumption data for the second fluid-heated mould tool; and
(ii) a system maximum resource consumption; and
a processor configured to:
monitor the first mould tool resource meter;
determine an unused resource availability; and
activate the second fluid-heated mould tool based on the stored resource consumption data of the second fluid-heated mould tool and the determined unused resource availability.

9. A mould tool system according to claim 8, wherein the memory further comprises, stored thereon, a mould tool queue comprising resource consumption data for a plurality of queued fluid-heated mould tools, and wherein the processor is further configured to selectively activate a next fluid-heated mould tool in the mould tool queue based on the stored resource consumption data of the next fluid-heated mould tool and the determined unused resource availability.

10. A mould tool system according to claim 8, further comprising an exhaust sensor configured to monitor the fluid exhaust of the first fluid-heated mould tool, and configured to adjust the stored resource consumption data of the second fluid-heated mould tool using fluid exhaust data from the exhaust sensor.

11. A method of controlling a plurality of mould tools, the method comprising:
providing a mould tool control system;
providing a plurality of heated mould tools, each having a variable resource demand cycle;
providing a maximum resource capacity that is lower than a sum of the maximum resource demands of the plurality of heated mould tools;
scheduling mould tool resource demand cycles using the mould tool control system such that a summed resource demand of the plurality of heated mould tools is always less than the maximum resource capacity;
monitoring a resource consumption of a running mould tool of the plurality of heated mould tools; and
using the mould tool control system to reschedule the mould tool resource demand cycles to account for any deviation of the running mould tool demand cycle from the scheduled mould tool resource demand cycle of the running mould tool.

12. A method of controlling a plurality of mould tools according claim 11, further comprising varying the maximum resource capacity over time.

13. A method of manufacturing a plurality of workpieces, the method comprising:
providing a plurality of heated mould tools, each having a variable resource demand cycle;
providing a plurality of units of workpiece material;
inserting each of the plurality of units of workpiece material in a respective mould tool;
controlling the mould tools according to the method of claim 11 to create moulded workpieces; and
extracting the moulded workpieces.

14. A method of controlling a plurality of mould tools according to claim 11, further comprising:
providing a heat recirculation sub-system configured to selectively conduit exhaust heat from the running mould tool into an input of another mould tool of the plurality of heated mould tools; and
using the mould tool control system to reschedule the mould tool resource demand cycles to account for the availability of thermal energy from the exhaust of the running mould tool.

15. A system for controlling a plurality of mould tools comprising:
a memory configured to store (i) a plurality of resource demand cycles, each for a respective mould tool and (ii) a maximum resource capacity;
a processor configured to control a schedule of the plurality of resource demand cycles such that a summed resource demand of the plurality of mould tools is always less than a maximum resource capacity;
an output configured to control the plurality of mould tools in accordance with scheduled resource demand cycles; and
a sensor configured to monitor a performance of a running mould tool, and to communicate a performance to the processor,
wherein the processor is further configured to adjust the scheduled resource demand cycles depending on a performance of the running mould tool.

16. A moulding facility comprising:
a system according to claim 15, and,
the plurality of mould tools controlled by the output.

17. A system for the control of a plurality of mould tools according to claim 15, further comprising:
a heat recirculation sub-system configured to selectively conduit exhaust heat from the running mould tool into an input of another mould tool of the plurality of mould tools, wherein the processor is further configured to adjust the schedule of the plurality of resource demand cycles depending on an availability of thermal energy from the exhaust of the running mould tool.

* * * * *